US011144010B2

(12) United States Patent
Kim et al.

(10) Patent No.: US 11,144,010 B2
(45) Date of Patent: Oct. 12, 2021

(54) FOCUS MODULATION OPTICAL SYSTEM AND HOLOGRAPHIC DISPLAY DEVICE HAVING THE SAME

(71) Applicant: SAMSUNG ELECTRONICS CO., LTD., Suwon-si (KR)

(72) Inventors: Young Kim, Yongin-si (KR); Hongseok Lee, Seoul (KR); Hoon Song, Yongin-si (KR); Jungkwuen An, Suwon-si (KR); Kanghee Won, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 16/287,493

(22) Filed: Feb. 27, 2019

(65) Prior Publication Data

US 2020/0050145 A1      Feb. 13, 2020

(30) Foreign Application Priority Data

Aug. 10, 2018   (KR) .................. 10-2018-0093992
Oct. 4, 2018    (KR) .................. 10-2018-0118499

(51) Int. Cl.
| | | |
|---|---|---|
| *G03H 1/04* | (2006.01) | |
| *G02B 6/12* | (2006.01) | |
| *G02F 1/133* | (2006.01) | |
| *G02F 1/1335* | (2006.01) | |
| *G02F 1/1343* | (2006.01) | |

(52) U.S. Cl.
CPC ....... *G03H 1/0406* (2013.01); *G02B 6/12007* (2013.01); *G02F 1/1343* (2013.01); *G02F 1/13306* (2013.01); *G02F 1/133526* (2013.01)

(58) Field of Classification Search
CPC ............... G03H 1/0406; G03H 1/2286; G02F 1/13306; G02F 1/133526; G02F 1/1343; G02F 1/1335; G02F 1/29; G02B 6/12007
USPC ................................................. 359/9
See application file for complete search history.

(56) References Cited

U.S. PATENT DOCUMENTS

| | | | |
|---|---|---|---|
| 9,632,005 B1 | 4/2017 | Olczak | |
| 9,720,246 B2 | 8/2017 | Won et al. | |
| (Continued) | | | |

FOREIGN PATENT DOCUMENTS

| | | |
|---|---|---|
| CN | 104298103 A | 1/2015 |
| KR | 10-2014-0135561 A | 11/2014 |
| (Continued) | | |

OTHER PUBLICATIONS

Communication dated Sep. 12, 2019 issued by the European Patent Office in counterpart European Application No. 19176012.3.

*Primary Examiner* — Kristina M Deherrera
(74) *Attorney, Agent, or Firm* — Sughrue Mion, PLLC

(57) ABSTRACT

A focus modulation optical system and a holographic display device having the focus modulation optical system are disclosed. The holographic display device includes a light source configured to emit a plurality of color lights, a focus modulation optical system including at least one variable focus lens that is configured to change a focusing position of incident light by electrical control of the at least one variable focus lens based on a color of light incident on the variable focus lens, and a spatial light modulator configured to form a holographic image by diffracting light output from the focus modulation optical system.

20 Claims, 11 Drawing Sheets

(56) References Cited

U.S. PATENT DOCUMENTS

| | | | | |
|---|---|---|---|---|
| 2004/0095558 A1* | 5/2004 | Whitehead | ............ | G03B 21/14 |
| | | | | 353/30 |
| 2012/0120335 A1 | 5/2012 | Galstian et al. | | |
| 2013/0314649 A1* | 11/2013 | Choi | ............ | G02B 30/27 |
| | | | | 349/96 |
| 2016/0021361 A1 | 1/2016 | Kroon et al. | | |
| 2017/0200423 A1 | 7/2017 | Kim et al. | | |
| 2018/0031866 A1 | 2/2018 | Hyde et al. | | |
| 2018/0120768 A1 | 5/2018 | Christmas | | |
| 2018/0129105 A1 | 5/2018 | Kim et al. | | |
| 2018/0173057 A1 | 6/2018 | Choi et al. | | |
| 2018/0239177 A1* | 8/2018 | Oh | ............ | G02B 6/0088 |
| 2019/0129178 A1* | 5/2019 | Patterson | ............ | G02B 6/0076 |

FOREIGN PATENT DOCUMENTS

| | | |
|---|---|---|
| KR | 10-2017-0084951 A | 7/2017 |
| KR | 10-2018-0052356 A | 5/2018 |

\* cited by examiner

FIG. 8

| FRAME | 1st frame | 2nd frame | . . . . . |
|---|---|---|---|

| LIGHT SOURCE | $L_R$ | $L_R$ | . . . . . |
| | $L_G$ | $L_G$ | |
| | $L_B$ | $L_B$ | |

| VARIABLE FOCUS LENS | V(R) | V(R) | . . . . . |
| | V(G) | V(G) | |
| | V(B) | V(B) | |

FOCUS MODULATION OPTICAL SYSTEM AND HOLOGRAPHIC DISPLAY DEVICE HAVING THE SAME

CROSS-REFERENCE TO RELATED APPLICATIONS

This application claims priority from Korean Patent Application No. 10-2018-0093992, filed on Aug. 10, 2018 in the Korean Intellectual Property Office, and Korean Patent Application No. 10-2018-0118499, filed on Oct. 4, 2018 in the Korean Intellectual Property Office, the disclosures of which are incorporated herein in their entirety by reference.

BACKGROUND

1. Field

Example embodiments of the present disclosure relate to a focus modulation optical system and a holographic display device including the same.

2. Description of the Related Art

Holographic display devices convert general image signals to holographic image signals and transmit a converted image to the left and right eyes by using an optical system, thereby displaying a three-dimensional (3D) image. A holographic display device is considered to be an ideal 3D display that does not cause eye fatigue while displaying a 3D image with clearer depth. However, in order to implement the above features, a high-resolution spatial light modulator (SLM) having a pixel of a wavelength size, a surface light source having coherence, and a relatively large amount of calculations for a computer generated hologram (CGH) are required.

Recently, to reduce the conditions of a data process amount and a resolution, a binocular hologram method, which provides a holographic image to only a visual field corresponding to each eye of an observer, has been suggested. For example, only a holographic image having a point of view corresponding to the left eye visual field of an observer and a holographic image having a point of view corresponding to the right eye visual field are generated and provided to the left eye and the right eye of the observer. In this case, since holographic images for the other point of view do not need to be generated, a data process amount may be significantly reduced, and thus a currently commercialized display device may satisfy a resolution condition of a spatial optical modulator.

In a holographic display device, chromatic aberration occurs as color light is used, and the chromatic aberration may deteriorate image quality.

SUMMARY

One or more example embodiments provide methods and apparatuses for a focus modulation optical system which may reduce chromatic aberration.

Further one or more example embodiments provide methods and apparatuses for a holographic display device including a focus modulation optical system which may reduce chromatic aberration.

Additional aspects will be set forth in part in the description which follows and, in part, will be apparent from the description, or may be learned by practice of example embodiments.

According to an aspect of an example embodiment, there is provided a focus modulation optical system including at least one variable focus lens configured to change a focusing position of incident light by electrical control according to a color, wherein the at least one variable focus lens is variable such that each color light forms a focus at a same position.

The at least one variable focus lens may include a first substrate, a first electrode layer disposed on the first substrate, a second substrate disposed opposite to the first substrate, a second electrode layer disposed on the second substrate, and a liquid crystal layer disposed between the first substrate and the second substrate, the liquid crystal layer including a plurality of active lenses that are configured to change based on a voltage applied between the first electrode layer and the second electrode layer.

At least one of the first electrode layer and the second electrode layer may include stripe-shape electrodes that are disposed apart from each other.

At least one of an array pitch, a shape, and a curvature of the plurality of active lenses may be adjusted based on a voltage applied to the stripe-shape electrodes.

The focus modulation optical system may further include a fixed focus lens configured to focus light incident on the variable focus lens.

The at least one color of light may include a first color light, a second color light, and a third color light, wherein the at least one variable focus lens includes a first variable focus lens configured to focus the first color light at a first position, a second variable focus lens configured to focus the second color light at the first position, and a third variable focus lens configured to focus the third color light at the first position, and wherein the first variable focus lens, the second variable focus lens, and the third variable focus lens may be sequentially disposed.

The focus modulation optical system may further include a first wavelength selective retarder provided in front of the first variable focus lens, a second wavelength selective retarder provided between the first variable focus lens and the second variable focus lens, and a third wavelength selective retarder provided between the second variable focus lens and the third variable focus lens.

The first wavelength selective retarder may be configured to convert the first color light from a first polarization to a second polarization, and transmit the second color light of the second polarization and the third color light of the second polarization, the second wavelength selective retarder may be configured to convert the first color light from the first polarization to the second polarization, convert the second color light from the second polarization to the first polarization, and transmit the third color light of the second polarization, and the third wavelength selective retarder may be configured to convert the third color light from the second polarization to the first polarization and transmit the first color light of the second polarization and the second color light of the second polarization.

The focus modulation optical system may further include a wavelength selective retarder provided in front of the at least one variable focus lens, the wavelength selective retarder being configured to selectively delay a phase based on a color of an incident light.

According to an aspect of another example embodiment, there is provided a holographic display device including a light source configured to emit a plurality of color lights, a focus modulation optical system including at least one variable focus lens that is configured to change a focusing position of incident light by electrical control of the at least one variable focus lens based on a color of light incident on the at least one variable focus lens, and a spatial light modulator configured to form a holographic image by diffracting light output from the focus modulation optical system.

The at least one variable focus lens may include a first substrate, a first electrode layer disposed on the first substrate, a second substrate disposed opposite to the first substrate, a second electrode layer disposed on the second substrate, and a liquid crystal layer disposed between the first substrate and the second substrate, the liquid crystal layer including a plurality of active lenses that are configured to change based on a voltage applied between the first electrode layer and the second electrode layer.

At least one of the first electrode layer and the second electrode layer may include stripe-shape electrodes that are disposed apart from each other.

At least one of an array pitch, a shape, and a curvature of the plurality of active lenses may be configured to change based on a voltage applied to the stripe-shape electrodes.

The holographic display device may further include a wavelength selective retarder provided in front of the at least one variable focus lens and configured to selectively delay a phase based on a color of an incident light.

The holographic display device may further include a fixed focus lens configured to focus light to be emitted on the wavelength selective retarder.

The holographic display device may further include a fixed focus lens configured to focus light to be emitted on the at least one variable focus lens.

The at least one variable focus lens may include a first variable focus lens configured to focus first color light at a first position, a second variable focus lens configured to focus second color light at the first position, and a third variable focus lens configured to focus third color light at the first position, and the first variable focus lens, the second variable focus lens, and the third variable focus lens may be sequentially disposed.

The holographic display device may further include a first wavelength selective retarder provided in front of the first variable focus lens, a second wavelength selective retarder provided between the first variable focus lens and the second variable focus lens, and a third wavelength selective retarder provided between the second variable focus lens and the third variable focus lens.

The holographic display device may further include a controller configured to control the light source to simultaneously emit first color light, second color light, and third color light, and to control the first variable focus lens, the second variable focus lens, and third variable focus lens to adjust a focusing position corresponding to each of the first color light, the second color light, and third color light, respectively.

The holographic display device may further include a beam deflector configured to deflect the plurality of color lights emitted from the light source.

The holographic display device may further include a position detection sensor configured to detect a position of a viewer viewing the holographic image.

The holographic display device may further include a controller configured to control the light source to time-sequentially emit a plurality of color lights, wherein the variable focus lens may be configured to time-sequentially adjust a focusing position corresponding to the plurality of color lights.

According to an aspect of another example embodiment, there is provided a holographic display device including a light source configured to emit a plurality of color lights, a beam deflector configured to deflect the plurality of color lights emitted from the light source, a light guide plate configured to guide the plurality of color lights deflected from the beam deflector, a focus modulation optical system including a fixed focus lens and a plurality of variable focus lenses that are configured to change a focusing position of the plurality of color lights output from the light guide plate by electrical control of the plurality of variable focus lenses based on a color of the plurality of color lights incident, and a spatial light modulator configured to form a holographic image by diffracting the plurality of color lights output from the focus modulation optical system.

The plurality of variable focus lenses may include a first variable focus lens configured to focus first color light at a first position, a second variable focus lens configured to focus second color light at the first position, and a third variable focus lens configured to focus third color light at the first position.

BRIEF DESCRIPTION OF THE DRAWINGS

The above and/or other aspects will become apparent and more readily appreciated from the following description of example embodiments, taken in conjunction with the accompanying drawings in which:

FIG. 8 illustrates a simultaneous operating mechanism of red light, green light, and blue light in the focus modulation optical system illustrated in FIG. 3;

DETAILED DESCRIPTION

Figure 1:
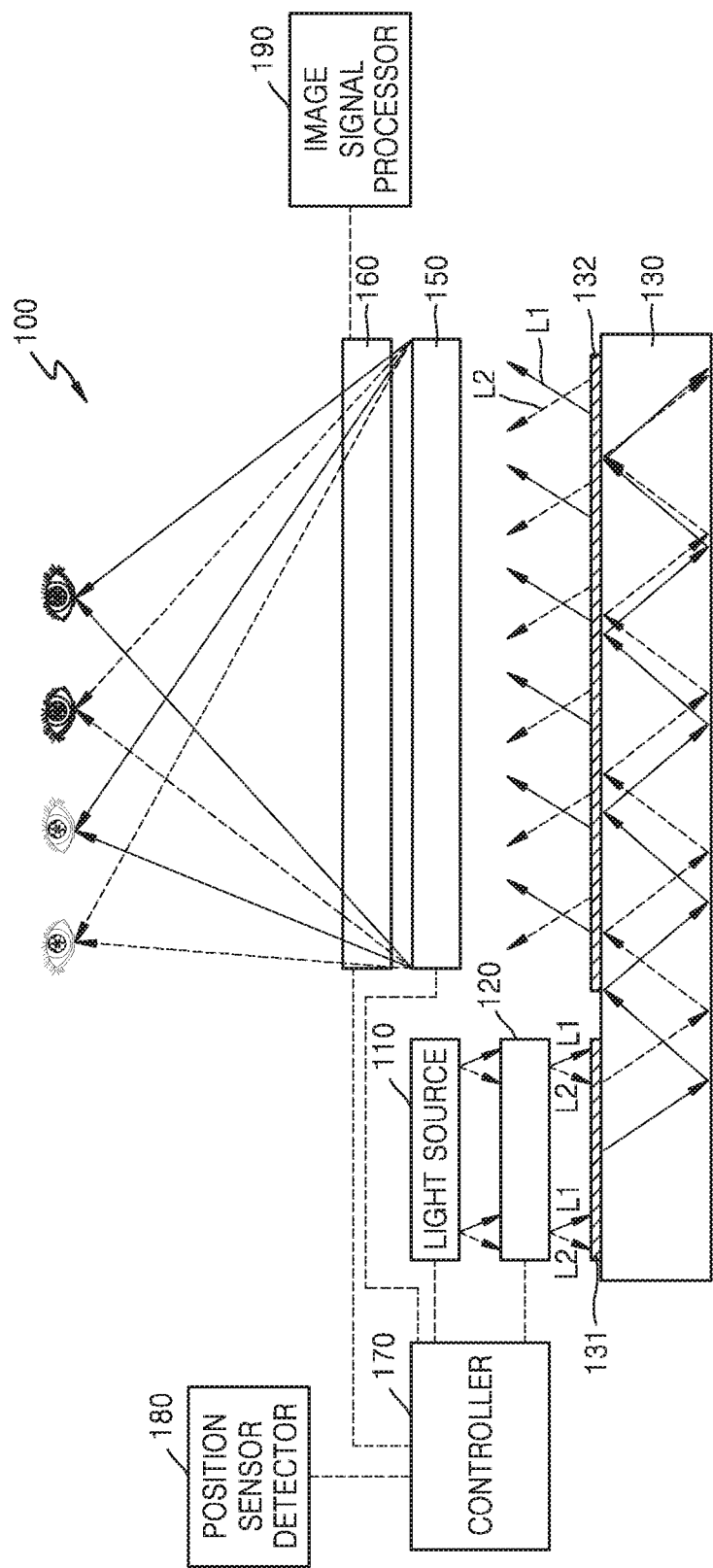
FIG. 1 schematically illustrates a holographic display device according to an example embodiment.

Reference will now be made in detail to a focus modulation optical system and a holographic display device having the same according to example embodiments, examples of which are illustrated in the accompanying drawings, wherein like reference numerals refer to like elements throughout. The size of each element illustrated in the drawings may be exaggerated for convenience of explanation and clarity. While such terms as "first," "second," etc., may be used to describe various components, such components must not be limited to the above terms. The above terms are used only to distinguish one component from another.

It will be further understood that the terms "comprises" and/or "comprising" used herein specify the presence of stated features or components, but do not preclude the presence or addition of one or more other features or components. Furthermore, when a material layer is described to exist on another layer, the material layer may exist directly on the other layer or a third layer may be interposed therebetween. Since a material forming each layer in the following embodiments is exemplary, other materials may be used therefor. The use of the terms "a" and "an" and "the" and similar referents in the context of describing the present disclosure are to be construed to cover both the singular and the plural.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 schematically illustrates a holographic display device 100 according to an example embodiment.

The holographic display device 100 may include a light source 110 for providing a light beam, a beam deflector 120 for deflecting the light beam from the light source 110, a focus modulation optical system 150 for adjusting a focus according to a wavelength of an incident beam, and a spatial light modulator 160 for forming a holographic image by diffracting an incident beam. Furthermore, the holographic display device 100 may further include a light guide plate 130 for guiding a beam deflected by the beam deflector 120 to travel toward the spatial light modulator 160, and a controller 170 for controlling a focal length to vary according to the wavelength of an incident beam in the focus modulation optical system 150. Furthermore, the controller 170 may control a deflection direction of the beam deflector 120. Furthermore, the holographic display device 100 may further include a position detection sensor 180 for tracking the position of a viewer.

The light source 110 may be a coherence light source for emitting coherence light including a plurality of wavelength bands. In order to provide light having high coherence, a laser diode (LD), for example, may be used as the light source 110. However, when light has a certain degree of spatial coherence, the light may be diffracted and modulated by the spatial light modulator 160, and thus a light-emitting diode (LED), for example, may be used as the light source 110. In addition to an LED, any light source capable of emitting light having spatial coherence may be used as the light source 110. Furthermore, in FIG. 1, the light source 110 is displayed as only one block, but the light source 110 may include a plurality of spot light source arrays. For example, the light source 110 may include a plurality of red emission lasers, a plurality of green emission lasers, and a plurality of blue emission lasers.

The beam deflector 120 may deflect the light beam from the light source 110. For example, light beams L1 and L2 may travel toward the left eye and the right eye, respectively. The incident beam may be time-sequentially deflected in two directions by the controller 170 or simultaneously deflected in two directions. The beam deflector 120 may include a beam deflection panel for changing a traveling direction of light by using an electrical signal. An example of a beam deflector may include a microelectromechanical system (MEMS) scanner, a galvano mirror, a linear spatial light modulator (SLM), and a liquid crystal beam deflector.

The light guide plate 130 may be formed of transparent glass or transparent plastic. For example, polymethyl methacrylate (PMMA) may be used as a material of the light guide plate 130. The light guide plate 130 may have a shape of, for example, a rectangular parallelepiped, to serve as an optical waveguide for guiding a light beam. The light beam incident on the end of one side of the light guide plate 130 may be transmitted to the end of an opposite side thereof by being totally internally reflected therein.

The focus modulation optical system 150 may correct chromatic aberration by modulating a focal length of the incident beam according to the wavelength of an incident beam. The focus modulation optical system 150 may include, for example, a variable focus lens.

Figure 2:
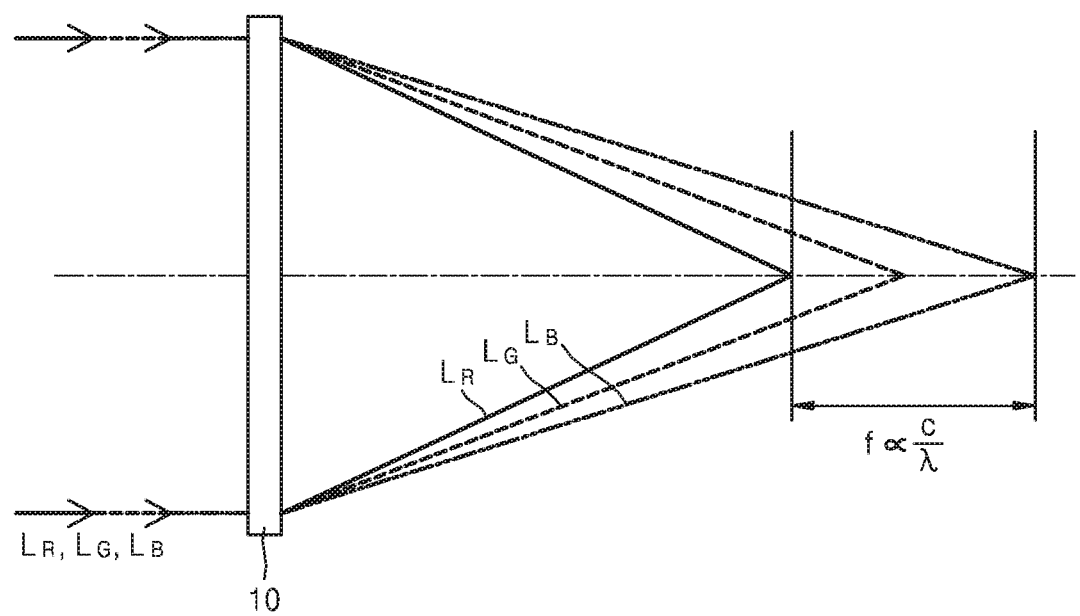
FIG. 2 illustrates chromatic aberration occurring when light of multi-wavelength is incident on a fixed focus diffractive lens.

FIG. 2 illustrates that chromatic aberration occurs when light beams having different wavelengths are incident on a fixed focus lens 10. The focal length is inversely proportional to the wavelength A of light. For example, when red light $L_R$, green light $L_G$, and blue light $L_B$ are incident on the fixed focus lens 10, the red light $L_R$ is focused at the shortest distance, the green light $L_G$ is focused at the second shortest distance, and the blue light $L_B$ is focused at the longest distance, and thus chromatic aberration occurs.

In an example embodiment, the focus modulation optical system 150 may reduce or remove chromatic aberration by modulating the focal length according to the wavelength of an incident beam.

The spatial light modulator 160 may form a hologram pattern to diffract and modulate an incident beam according to a hologram signal provided by an image signal processor 190. Any one of a phase modulator capable of performing phase modulation only, an amplitude modulator capable of performing amplitude modulation only, and a combined modulator capable of performing both the phase modulation and amplitude modulation may be used as the spatial light modulator 160. Although FIG. 1 illustrates the spatial light modulator 160 to be a transmissive spatial light modulator, a reflective spatial light modulator may be employed. For a transmissive type, the spatial light modulator 160 may use, for example, a semiconductor modulator based on a compound semiconductor such as gallium arsenide (GaAs), or a liquid crystal device (LCD). For a reflective type, the spatial light modulator 160 may use, for example, a digital micromirror device (DMD) or a liquid crystal on silicon (LCoS).

The light beam emitted from the light source 110 may be deflected by the beam deflector 120, guided by the light guide plate 130, enlarged by the focus modulation optical system 150 to a size corresponding to the size of the spatial light modulator 160, and then incident on the spatial light modulator 160. The light guide plate 130 may include an input coupler 131 for receiving the beam deflected by the beam deflector 120 and incident on the light guide plate 130, and an output coupler 132 for outputting a light beam traveling by being guided by the light guide plate 130. The input coupler 131 may include, for example, a collimating lens. The collimating lens may make an incident beam into a parallel beam to be incident on the light guide plate 130. Accordingly, a light coupling efficiency with respect to the light guide plate 130 may be increased. The output coupler 132 may include a grating. The grating may increase light output efficiency by using the diffraction efficiency of output light.

A directional light beam output from the light guide plate 130 may be incident on the spatial light modulator 160 through the focus modulation optical system 150. The spatial light modulator 160 may form a hologram pattern having an interference pattern to modulate the incident beam. As the incident beam is diffracted and modulated by the hologram pattern formed by the spatial light modulator 160, a holographic image may be reproduced at a position in a certain space. For example, a left eye holographic image may be reproduced at a left eye position, and a right eye holographic image may be reproduced at a right eye position.

The position detection sensor 180 may track the position of a viewer and transmit the position of a viewer to the controller 170. The controller 170 may control the beam deflector 120 according to the position of a viewer so that the light beam may be directed toward the eyes of the viewer. The beam deflector 120 may deflect the light beam by electrical control to adjust the travelling direction of the light beam.

Figure 3:
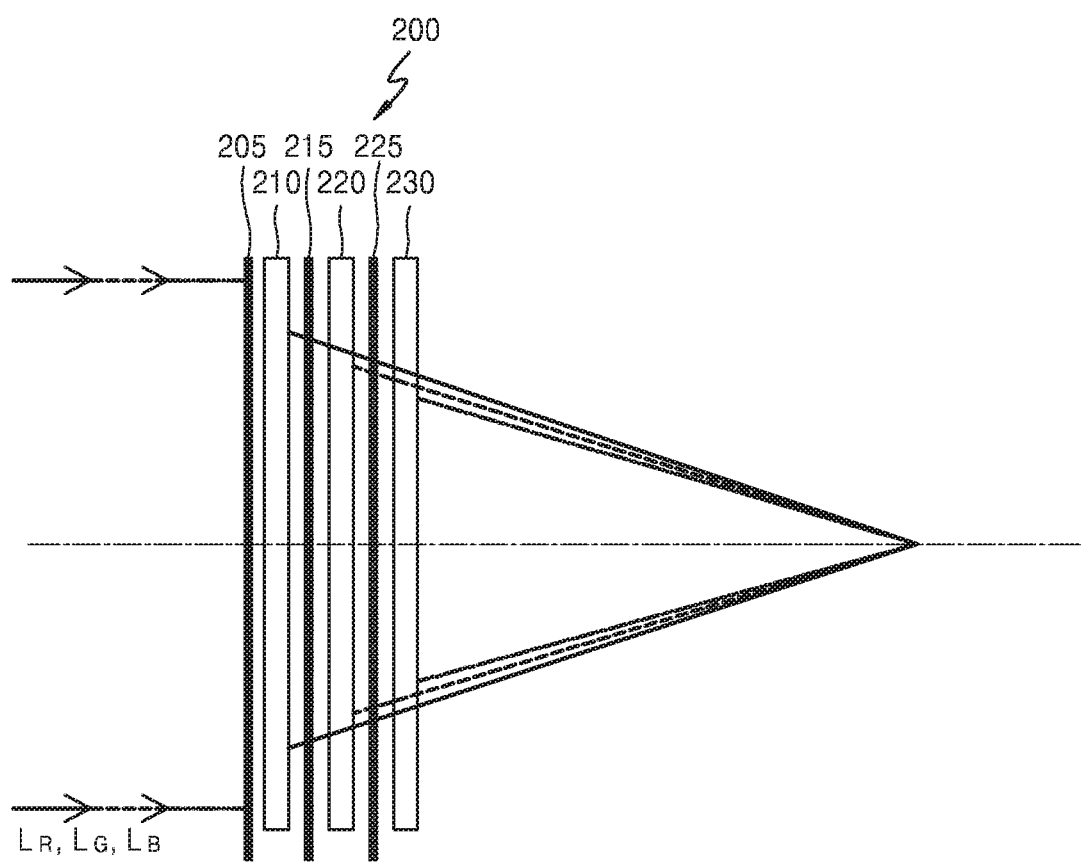
FIG. 3 illustrates a focus modulation optical system according to an example embodiment.

FIG. 3 illustrates a focus modulation optical system 200 according to an embodiment. The focus modulation optical system 200 may include a plurality of wavelength selective retarders and a variable focus lens corresponding to each of the plurality of wavelength selective retarders. The wavelength selective retarder may selectively retard the phase of incident light according to the wavelength and color of the incident light. For example, the focus modulation optical system 200 may include a first wavelength selective retarder 205, a first variable focus lens 210, a second wavelength selective retarder 215, a second variable focus lens 220, a third wavelength selective retarder 225, and a third variable focus lens 230.

Figure 4:
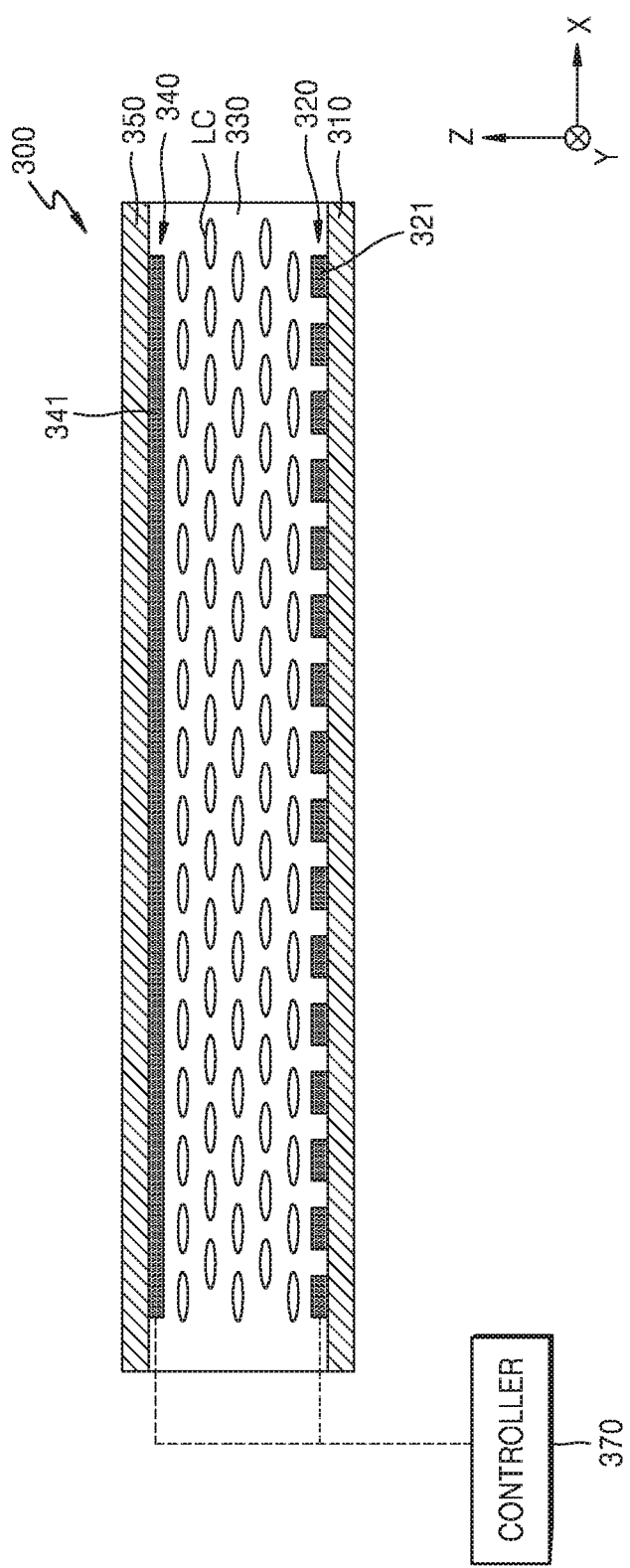
FIG. 4 illustrates an example of a variable focus lens of a focus modulation optical system according to an example embodiment.

FIG. 4 illustrates an example of a variable focus lens 300. The variable focus lens 300 may be a liquid crystal lens for controlling a focal length by electrically changing an arrangement of liquid crystals. The variable focus lens 300 may include a first substrate 310, a first electrode layer 320 including a plurality of first electrodes 321 arranged spaced apart from each other on the first substrate 310, a second substrate 350 disposed opposite to the first substrate 310, a second electrode layer 340 provided on the second substrate 350 and having a second electrode 341, and a liquid crystal layer 330 provided between the first substrate 310 and the second substrate 350.

The first substrate 310 and the second substrate 350 may include an insulating substrate and may be formed of, for example, glass or transparent plastic.

Figure 5:
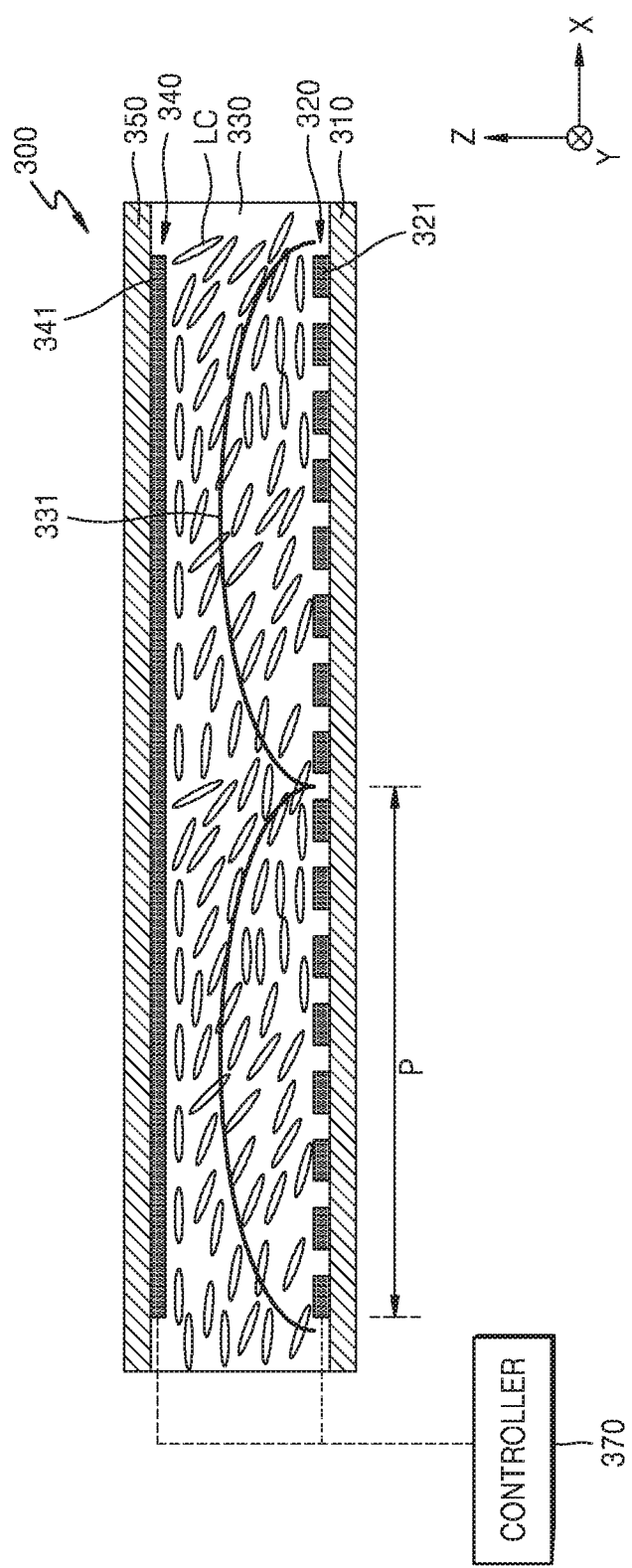
FIG. 5 illustrates an operation of the variable focus lens of FIG. 4.

Each of the plurality of first electrodes 321 may be independently driven. Referring to FIG. 5, the liquid crystal layer 330 may include a plurality of active lenses 331 that are formed as the array of liquid crystal molecules are changed according to an electric field formed between the first electrode layer 320 and the second electrode layer 340. At least one of an array pitch P, a shape, and a curvature of the active lenses 331 that varies according to a voltage applied between the first electrodes 321 and the second electrode 341 may be changed. The focal length of the incident beam may be controlled according to the array pitch P, shape, and curvature of the active lenses 331.

The first electrodes 321 may have, for example, a stripe shape, and may be arranged parallel to each other. The second electrode 341, as a common electrode, may have a single panel shape. However, example embodiments are not limited thereto, and the second electrode 341 may be a plurality of electrodes having a stripe shape and arranged spaced apart from each other. The first electrodes 321 and the second electrode 341 may include a transparent conductive material, for example, indium-tin-oxide (ITO), indium-zinc-oxide (IZO), and indium-tin-zinc-oxide (ITZO).

The liquid crystal layer 330 may include liquid crystal (LC) molecules. The LC molecules may be initially aligned such that a major axis direction thereof is parallel to one direction, for example, a direction x. An alignment layer for the alignment of LC molecules may be further provided on at least one of the first substrate 310 and the second substrate 350.

Referring to FIG. 5, the active lenses 331 may be formed as the array of the LC molecules is changed by the voltage applied between the first electrodes 321 and the second electrode 341. The shape of the active lenses 331 may vary according to the voltage applied between the first electrodes 321 and the second electrode 341. The active lenses 331 are formed because the refractive index of the LC molecules in the major axis direction and the refractive index thereof in the minor axis direction are different from each other. In other words, the LC molecule has different refractive indexes with respect to light polarized parallel to the major axis direction and light polarized parallel to a direction perpendicular to the major axis direction, with respect to the light incident on the LC molecule. The liquid crystal layer 330 performs refraction only on polarized light of one direction and transmits polarized light of the other directions without refraction.

As shown in FIG. 4, in the initial alignment state in which no voltage is applied between the first electrodes 321 and the second electrode 341, the LC molecules are all aligned in a direction parallel to each other, and thus light of a certain polarization may have an identical refractive index at any position. As illustrated in FIG. 5, when a certain electric distribution is formed in the liquid crystal layer 330 according to the voltage applied between the first electrodes 321 and the second electrode 341, the LC molecules are aligned depending on the electric field direction. For example, the major axis direction of the LC molecules may be aligned in an electric field direction when dielectric anisotropy is positive, and in a direction perpendicular to the electric field direction when the dielectric anisotropy is negative. Different voltages may be applied to the first electrodes 321, and accordingly, the alignment form of each of the LC molecules differs at each position. Since the refractive index of each of the LC molecules is different in the major axis direction and the minor axis direction, a refractive index gradient may be obtained according to the distribution of the LC molecules in the major axis direction. The active lens may be formed according to the refractive index gradient in the liquid crystal layer 330. The array pitch, shape, and curvature of the active lens may be adjusted by controlling the distribution of the LC molecules in the major axis direction according to the electric field distribution of the liquid crystal layer 330.

The active lenses 331 are formed through the alignment of the LC molecule in the major axis direction because the major axis direction of the LC molecule differs at each position in the liquid crystal layer 330. Accordingly, the active lenses 331 may act only on the light polarized in a direction parallel to the major axis direction of the LC molecule in the initial alignment state, for example, in a direction parallel to the direction x. In the following description, the polarization parallel to the direction x is referred to as the first polarization and indicated by a symbol "↔".

When the LC molecules are aligned as illustrated in FIG. 5, the major axis direction of the LC molecule at each position differs, but the minor axis direction thereof is identically in a direction y. Accordingly, when the light incident on the liquid crystal layer 330 is polarized in the direction y, no refraction occurs. In the following description, the polarization parallel to the direction y is referred to as the second polarization and indicated by a symbol "□".

In other words, when the light incident on the liquid crystal layer 330 has the first polarization (↔) that is polarized parallel to the direction x, the focal length of the light is changed by the active lenses 331, and when the light of the second polarization (⊙) that is polarized in a direction parallel to the direction y is incident, the light is transmitted through the liquid crystal layer 330 without change.

For example, when a sequentially increasing voltage is applied to an n-number of the first electrodes 321, where n is a natural number, and when a sequentially increasing voltage is applied to a number of the first electrodes 321 that is greater than n, the active lenses 331 are changed, and thus the focal length of the light may be changed. The controller 370 may control the voltage applied to the first electrodes 321. According to an example embodiment, the shape of an active lens may be formed by applying a first voltage to the two neighboring first electrodes 321 and then applying no voltage to the next two first electrodes 321 or applying the same voltage as the second electrode 341 thereto.

Figure 6:
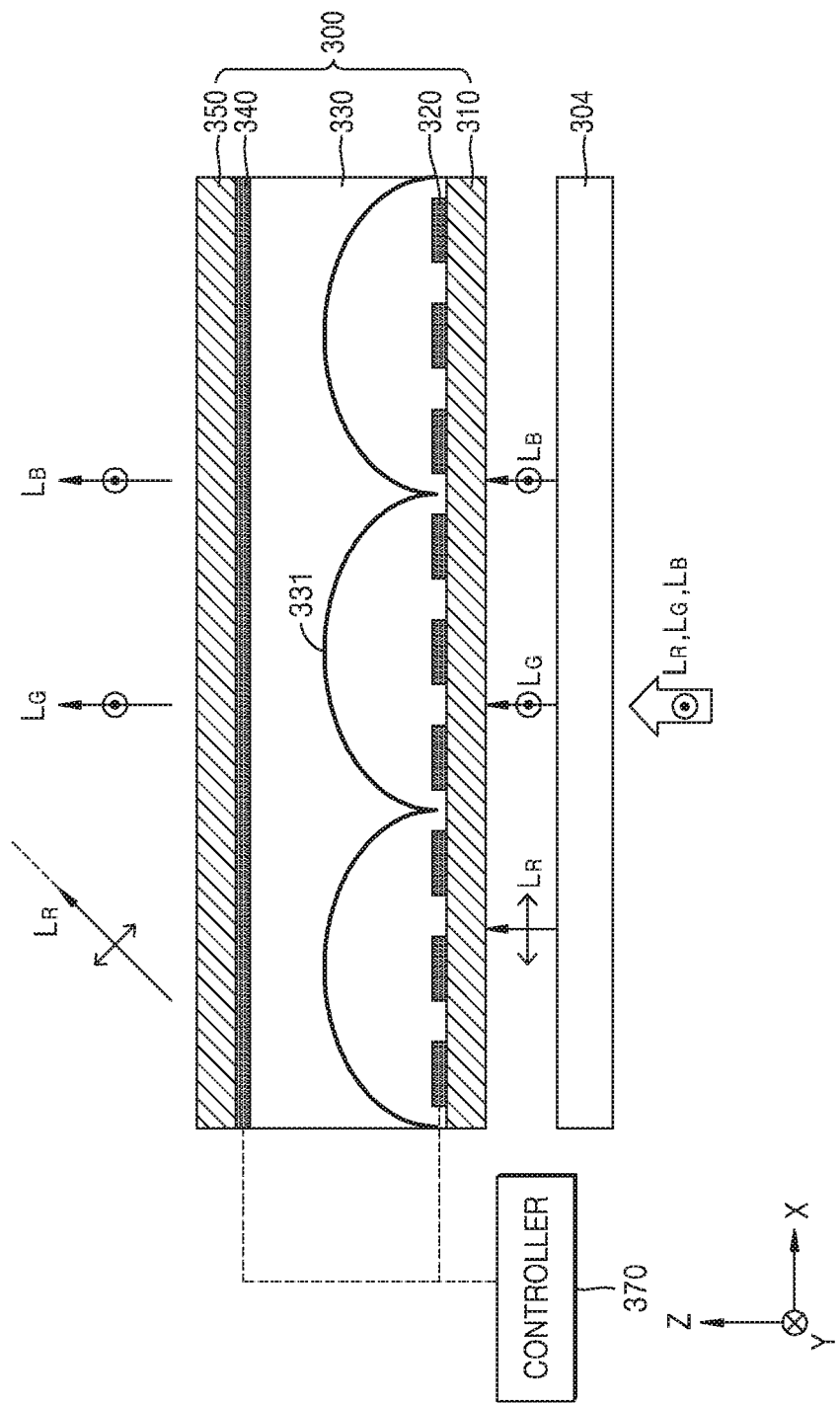
FIG. 6 illustrates an operation of a focus modulation optical system according to an example embodiment.

FIG. 6 illustrates a wavelength selective retarder 304 and an operation of the variable focus lens 300 corresponding thereto, according to an example embodiment.

For example, when first wavelength light $L_R$ of the second polarization (⊙), second wavelength light $L_G$ of the second polarization (⊙), and third wavelength light $L_B$ of the second polarization (⊙) are incident on the focus modulation optical system, the wavelength selective retarder 304 converts the first wavelength light $L_R$ to the first polarization (↔), and outputs the second wavelength light $L_G$ and the third wavelength light $L_B$ in a second polarization (⊙) state. The output lights are incident on the variable focus lens 300.

The variable focus lens 300 may perform refraction on, for example, only the light of the first polarization (↔). Accordingly, the first wavelength light $L_R$ of the first polarization (↔) is refracted and output with a first focal length, and the second wavelength light $L_G$ and the third wavelength light $L_B$ of the second polarization (⊙) are output without a change in the focal length.

Figure 7:
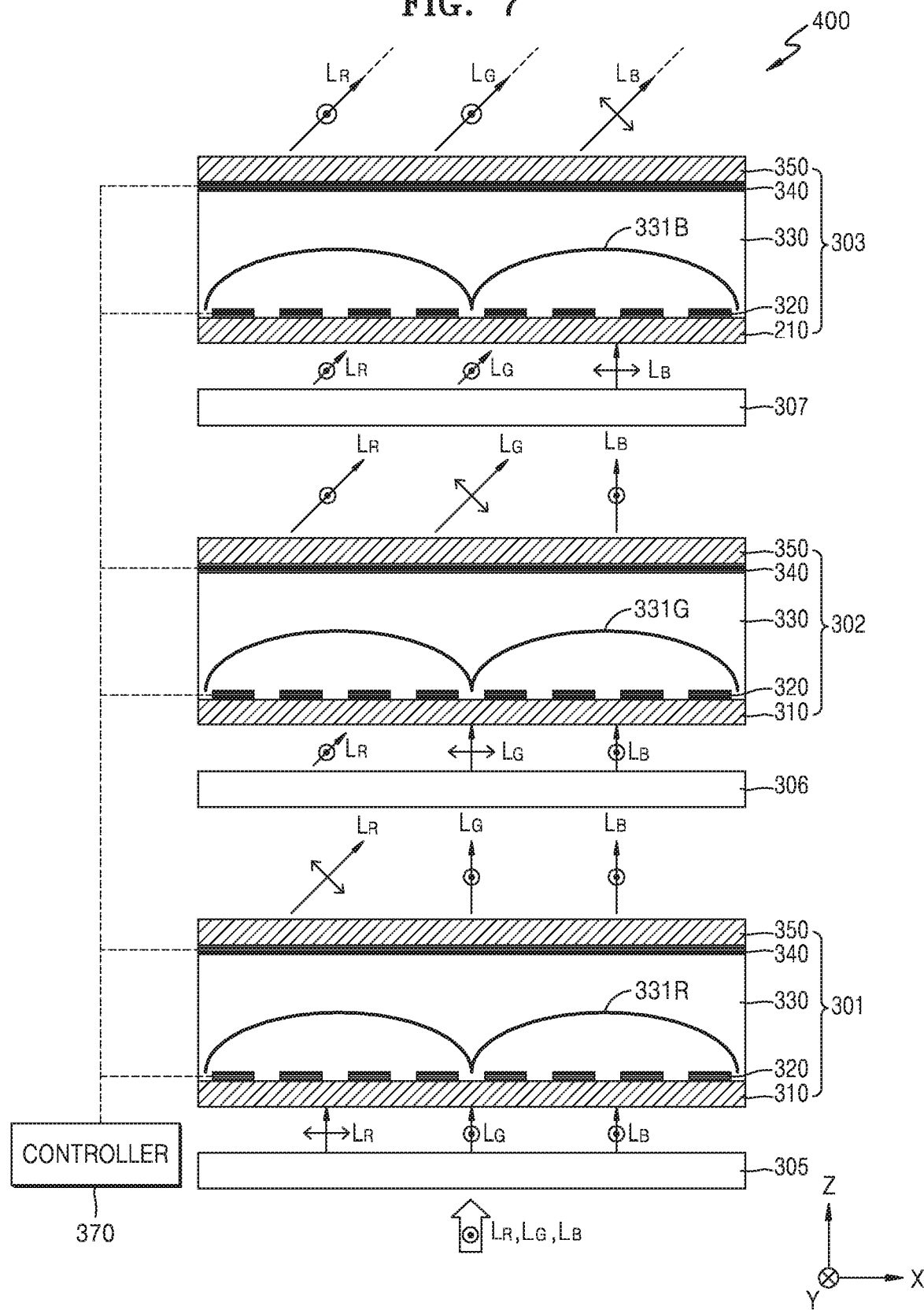
FIG. 7 illustrates a process of removing chromatic aberration in a focus modulation optical system according to an example embodiment.

FIG. 7 illustrates an example in which the focus modulation optical system 200 of FIG. 3 is implemented in detail.

Referring to FIG. 7, a focus modulation optical system 400 may include a structure in which a first wavelength selective retarder 305, a first variable focus lens 301, a second wavelength selective retarder 306, a second variable focus lens 302, a third wavelength selective retarder 307, and a third variable focus lens 303 are sequentially stacked. The first variable focus lens 301, the second variable focus lens 302, and the third variable focus lens 303 may each have substantially the same structure as that of the variable focus lens 300 described with respect to FIG. 6.

For example, when first wavelength light $L_R$ of the second polarization (⊙), second wavelength light $L_G$ of the second polarization (⊙), and third wavelength light $L_B$ of the second polarization (⊙) are incident on the focus modulation optical system 400, the first wavelength selective retarder 305 may convert the polarization of the first wavelength light $L_R$ to the first polarization (↔) and may output the second wavelength light $L_G$ and the third wavelength light $L_B$ in a second polarization (⊙) state, and the first variable focus lens 301 may change the focal length of the light output from the first wavelength selective retarder 305 and output the second wavelength light $L_G$ and the third wavelength light $L_B$ of the second polarization (⊙) without change in the focal length.

The second wavelength selective retarder 306, which is arranged on an optical path of the light that passed through the first variable focus lens 301, may convert the polarization of the second wavelength light $L_G$ to the first polarization (↔), convert the first wavelength light $L_R$ to a second polarization (⊙) state, and output the third wavelength light $L_B$ in a second polarization (⊙) state without change, and the second variable focus lens 302 may change the focal length of the second wavelength light $L_G$ output from the second wavelength selective retarder 306, and may output the first wavelength light $L_R$ and the third wavelength light $L_B$ of the second polarization (⊙) without change in the focal length.

The third wavelength selective retarder 307, which is arranged on an optical path of the light that passed through the second variable focus lens 302, may convert the polarization of the third wavelength light $L_B$ to the first polarization (↔), convert the second wavelength light $L_G$ to the second polarization (⊙), and output the first wavelength light $L_R$ in a second polarization (⊙) state without change, and the third variable focus lens 303 may change the focal length of the third wavelength light $L_B$ output from the third wavelength selective retarder 307, and may output the first wavelength light $L_R$ and the second wavelength light $L_G$ of the second polarization (⊙) without change in the focal length. The controller 370 may control the first to third variable focus lenses 301, 302, and 303.

The controller 370 may control a voltage applied to the first to third variable focus lenses 301, 302, and 303 so that the focuses of the respective color light may be formed at the same position regardless of the wavelength of the incident light.

An operation in which the focus modulation optical system 400 controls a focal length is described below.

White light or light of various wavelength bands may be incident on the focus modulation optical system 400. The incident light may be split by the first wavelength selective retarder 305 into the first color light $L_R$ of the first polarization (↔), the second color light $L_G$ of the second polarization (⊙), and the third color light $L_B$ of the second polarization (⊙).

The first color light $L_R$ of the first polarization (↔), the second color light $L_G$ of the second polarization (⊙), and the third color light $L_B$ of the second polarization (⊙) are incident on the first variable focus lens 301. The first variable focus lens 301 may include a first active lens 331R by electrical control and may allow a focusing position of the first color light $L_R$ of the first polarization (↔) to be a first position. Since the first variable focus lens 301 performs refraction only on the light of the first polarization (↔), only the focus of the first color light $L_R$ of the first polarization (↔) may be adjusted and the second color light $L_G$ of the second polarization (⊙) and the third color light $L_B$ of the second polarization (⊙) may be output without a change by the first variable focus lens 301.

Next, the first color light $L_R$ of the first polarization (↔), the second color light $L_G$ of the second polarization (⊙), and the third color light $L_B$ of the second polarization (⊙) are incident on the second wavelength selective retarder 306. The second wavelength selective retarder 306 changes the polarization of the second color light $L_G$ to the first polarization (↔). Furthermore, the second wavelength selective retarder 306 changes the first color light $L_R$ of the first polarization (↔) to the second polarization (⊙), but does not affect the third color light $L_B$ of the second polarization (⊙). The first color light $L_R$ of the second polarization (⊙), the second color light $L_G$ of the first polarization (↔), and the third color light $L_B$ of the second polarization (⊙) are incident on the second variable focus lens 302 by the second wavelength selective retarder 306.

The second variable focus lens 302 may include the second active lens 331G by electrical control and may allow the focus of the second color light $L_G$ to be formed at the first position. Since the second variable focus lens 302 acts only to the light of the first polarization (↔), the first color light $L_R$ of the second polarization (⊙) and the third color light $L_B$ of the second polarization (⊙), which are incident light, are not affected.

Next, the first color light $L_R$ of the second polarization (⊙), the second color light $L_G$ of the first polarization (↔), and the third color light $L_B$ of the second polarization (⊙) are incident on the third wavelength selective retarder 307. The third wavelength selective retarder 307 changes the second polarization (⊙) of the third color light $L_B$ to the first polarization (↔). Furthermore, the third wavelength selective retarder 307 changes the second color light $L_G$ of the first polarization (↔) to the second polarization (⊙) and does not affect the first color light $L_R$ of the second polarization (⊙). An optically anisotropic material having wavelength selectivity with respect to the second color light $L_G$ and the third color light $L_B$ may be used as a material of the third wavelength selective retarder 307. The third wavelength selective retarder 307 may change the polarization direction of the second color light $L_G$ and the third color light $L_B$. The first color light $L_R$ of the second polarization (⊙), the second color light $L_G$ of the second polarization (⊙), and the third color light $L_B$ of the first polarization (↔) are incident on the third variable focus lens 303 by the third wavelength selective retarder 307.

The third variable focus lens 303 may include a third active lens 331B by electrical control and may allow the focus of the third color light $L_B$ to be formed at the first position. Furthermore, since the third variable focus lens 303 acts only on the light of the first polarization (↔), among the first color light $L_R$ of the second polarization (⊙), the second color light $L_G$ of the second polarization (⊙), and the third color light $L_B$ of first polarization (↔), only the third color light $L_B$ of the first polarization (↔) may be focused at the first position by the third variable focus lens 303. Through the above processes, the first color light $L_R$, the second color light $L_G$, and the third color light $L_B$ may be focused at the same first position.

FIG. 8 illustrates the simultaneous operating mechanism of red light, green light, and blue light in the focus modulation optical system 200 illustrated in FIG. 3.

In a holographic display device of an example embodiment, when an image of a plurality of frames are displayed, at each frame, the red light $L_R$, the green light $L_G$, and the blue light $L_B$ may be simultaneously incident on the focus modulation optical system. For example, at a first frame, the red light $L_R$, the green light $L_G$, and the blue light $L_B$ from the light source may be simultaneously incident on the variable focus lens. A voltage V(R) for adjusting a focus of the red light $L_R$, a voltage V(G) for adjusting a focus of the green light $L_G$, and a voltage V(B) for adjusting a focus of the blue light $L_B$ may be applied to the variable focus lens. The focus may be adjusted at a second frame in the same manner. In the simultaneous operating mechanism, as the focus modulation optical system simultaneously operates with respect to a plurality of color lights, a frame rate may be relatively high.

Figure 9:
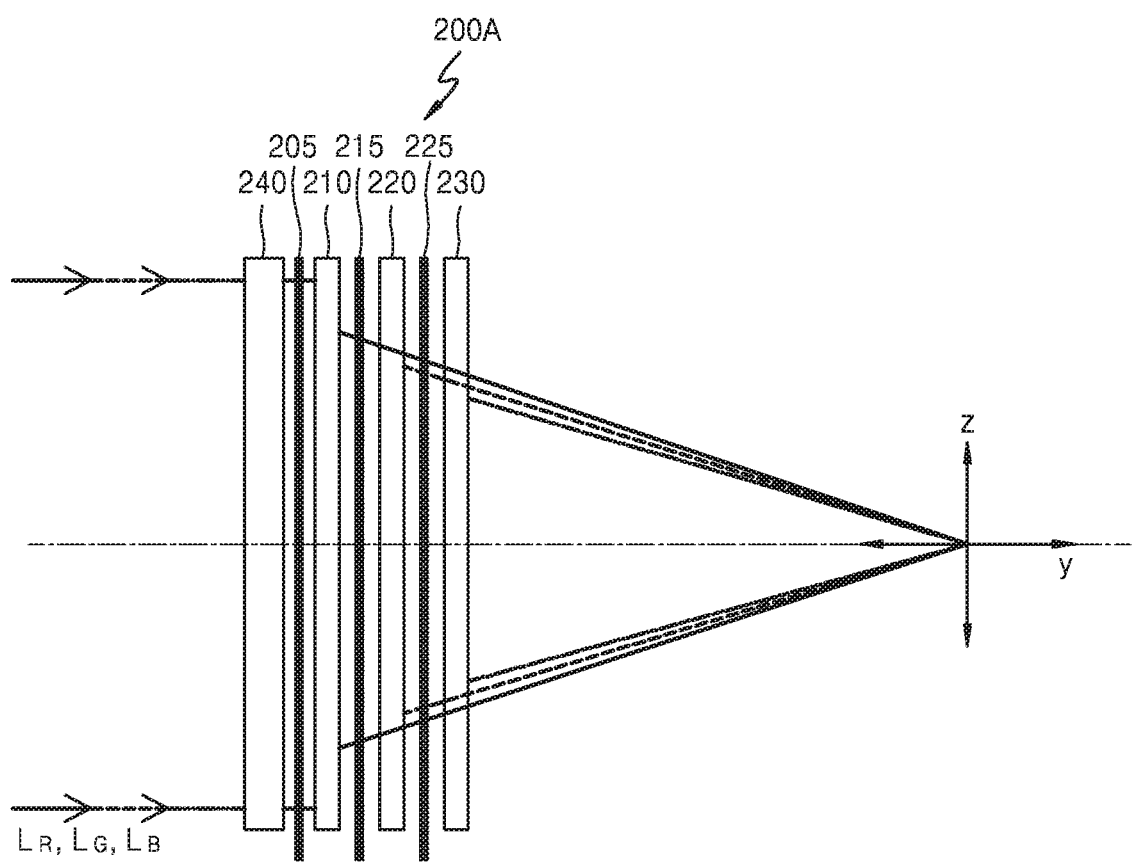
FIG. 9 illustrates an example in which a fixed focus lens is further provided in a focus modulation optical system according to an example embodiment.

FIG. 9 illustrates a focus modulation optical system 200A according to an example embodiment. The focus modulation optical system 200A may further include a fixed focus lens 240 in addition to the elements of the focus modulation optical system 200 illustrated in FIG. 3. The fixed focus lens 240 may be disposed in front of the first wavelength selective retarder 205. The fixed focus lens 240 may be a lens that is configured to focus any one of the wavelength light. For example, the fixed focus lens 240 may be a lens that is configured to focus the green light. However, example embodiments are not limited thereto, and the fixed focus lens 240 may focus an appropriate color light other than green light. For example, the fixed focus lens 240 may be designed to primarily reduce chromatic aberration with respect to each color light. The fixed focus lens 240 may be difficult to manufacture and may incur considerable manufacturing costs to more precisely correct chromatic aberration. However, the fixed focus lens 240 may be manufactured at a low cost to preliminary reduce chromatic aberration.

Next, the focus with respect to each color light may be adjusted by the first wavelength selective retarder 205, the second wavelength selective retarder 215, and third wavelength selective retarder 225 and the first variable focus lens 210, the second variable focus lens 220, and third variable focus lens 230, and thus chromatic aberration may be further corrected more precisely.

In other words, after preliminarily correcting chromatic aberration by using the fixed focus lens 240, chromatic aberration may be corrected more precisely by the wavelength selective retarders and the variable focus lenses.

Figure 10:
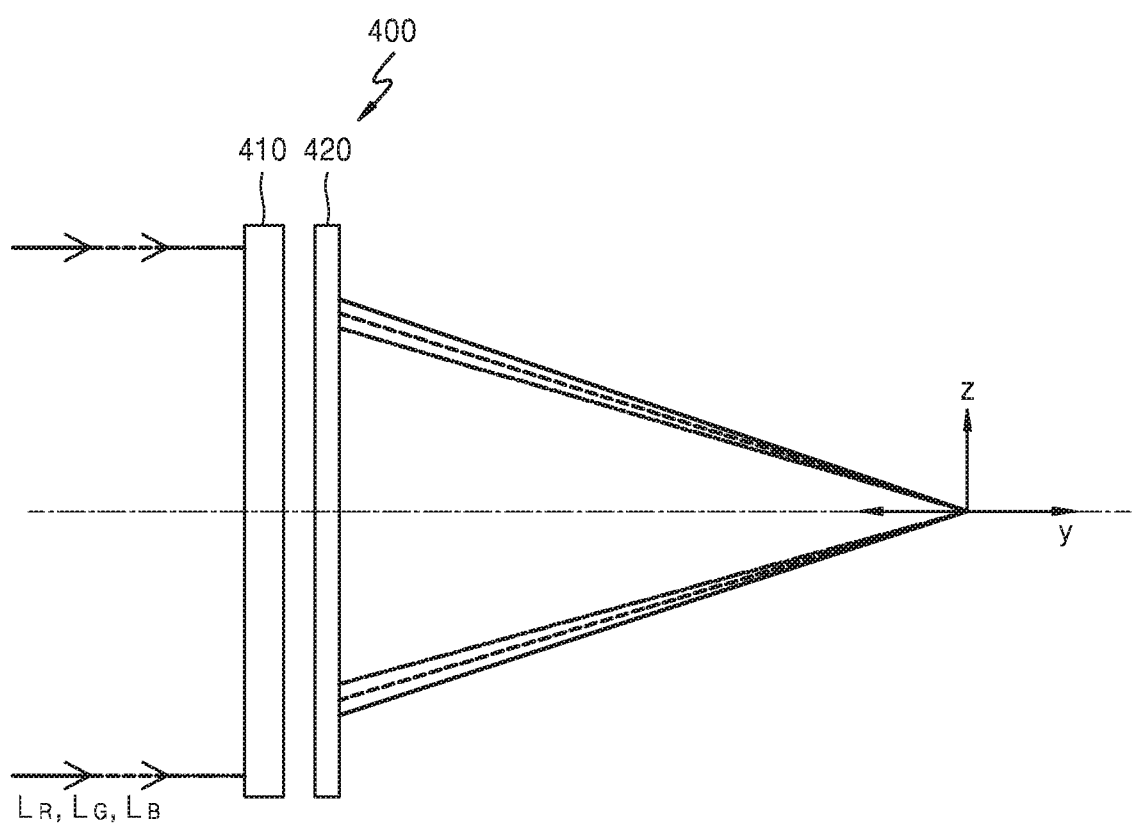
FIG. 10 illustrates a focus modulation optical system according to an example embodiment.

FIG. 10 illustrates a focus modulation optical system 400 according to an example embodiment.

The focus modulation optical system 400 may include a fixed focus lens 410 and a variable focus lens 420.

The variable focus lens 420 may have a structure described with reference to FIGS. 4 and 5. Referring to FIGS. 4 and 5, the variable focus lens 420 may control the active lenses 331 by adjusting the voltage applied between the first electrodes 321 and the second electrode 341 according to the wavelength of the incident light. Thus, chromatic aberration may be reduced or removed by adjusting the focal length of each color light.

Figure 11:
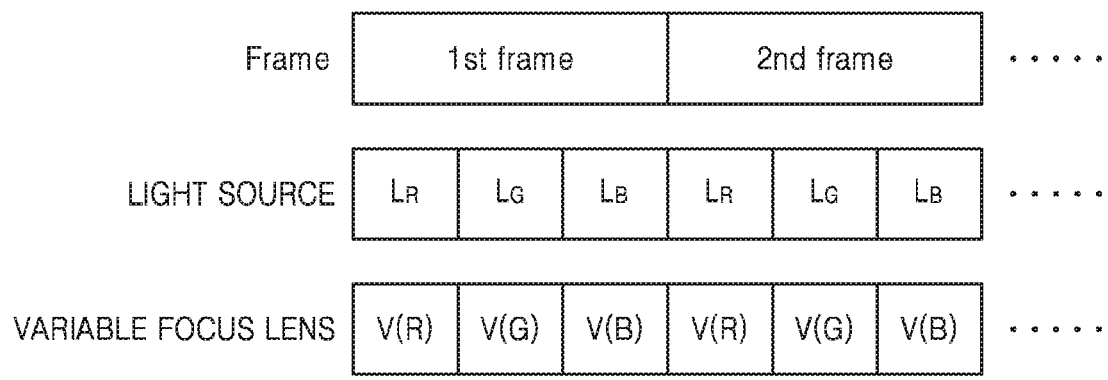
FIG. 11 illustrates a time sequential operating mechanism of red light, green light, and blue light in the focus modulation optical system illustrated in FIG. 10.

In the focus modulation optical system 400 illustrated in FIG. 10, each color light may be time-sequentially input. FIG. 11 illustrates a time sequential operating mechanism of the red light $L_R$, the green light $L_G$, and the blue light $L_B$.

In the holographic display device of an example embodiment, when an image having a plurality of frames is displayed, at each frame, the red light $L_R$, the green light $L_G$, and the blue light $L_B$ are time-sequentially input to the focus modulation optical system 400. For example, at a first frame, the red light $L_R$ from the light source may be incident on the focus modulation optical system 400, and the voltage V(R) for adjusting the focus of the red light $L_R$ may be applied to the variable focus lens 420. For example, the red light $L_R$ may be focused at a first position. Next, the green light $L_G$ may be incident on the variable focus lens 420, and a voltage V(G) for adjusting the focus of the green light $L_G$ may be applied to the focus the variable focus lens 420. The green light $L_G$ may be focused at the first position. Next, the blue light $L_B$ may be incident on the variable focus lens 420, and a voltage V(B) for adjusting the focus of the blue light $L_B$ may be applied to the variable focus lens 420. The blue light $L_B$ may be focused at the first position. The focus may be adjusted at a second frame in the same manner. In the time sequential operating mechanism, as the focus modulation optical system is time-sequentially operated with respect to a plurality of color lights, the frame rate may be relatively lower than that of the simultaneous operating mechanism. Instead, the focus modulation optical system may be made slimmer than the simultaneously operating focus modulation optical system. When the operation speed of the variable focus lens is sufficiently fast, a necessary frame rate may be secured and the focus modulation optical system may be reduced or miniaturized. Furthermore, although in FIG. 10 the fixed focus lens 410 is provided, chromatic aberration may be reduced by adjusting the focus by using only the variable focus lens 420 without the fixed focus lens 410.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A focus modulation optical system comprising:
at least one variable focus lens configured to change a focusing position of incident light by electrical control according to a color such that each color light forms a focus at a same position, the at least one variable focus lens comprising:
a first variable focus lens configured to focus a first color light at a first position;
a second variable focus lens configured to focus a second color light at the first position; and
a third variable focus lens configured to focus a third color light at the first position, wherein the first variable focus lens, the second variable focus lens, and the third variable focus lens are sequentially disposed;
a first wavelength selective retarder provided in front of the first variable focus lens, the first wavelength selective retarder being configured to convert the first color light from a first polarization to a second polarization, and transmit the second color light of the second polarization and the third color light of the second polarization;
a second wavelength selective retarder provided between the first variable focus lens and the second variable focus lens, the second wavelength selective retarder being configured to convert the first color light from the first polarization to the second polarization, convert the second color light from the second polarization to the first polarization, and transmit the third color light of the second polarization; and
a third wavelength selective retarder provided between the second variable focus lens and the third variable focus lens, the third wavelength selective retarder being configured to convert the third color light from the second polarization to the first polarization and transmit the first color light of the second polarization and the second color light of the second polarization, and
wherein each of the first variable focus lens, the second variable focus lens, and the third variable focus lens comprises a first substrate, a first electrode layer provided on the first substrate, a second substrate disposed opposite to the first substrate, a second electrode layer provided on the second substrate, and a liquid crystal layer provided between the first substrate and the second substrate.

2. The focus modulation optical system of claim 1, wherein
the liquid crystal layer comprises a plurality of active lenses that are configured to change based on a voltage applied between the first electrode layer and the second electrode layer.

3. The focus modulation optical system of claim 2, wherein at least one of the first electrode layer and the second electrode layer comprises stripe-shape electrodes that are disposed apart from each other.

4. The focus modulation optical system of claim 3, wherein at least one of an array pitch, a shape, and a curvature of the plurality of active lenses is adjusted based on a voltage applied to the stripe-shape electrodes.

5. The focus modulation optical system of claim 1, further comprising a fixed focus lens configured to focus light incident on the at least one variable focus lens.

6. The focus modulation optical system of claim 1, further comprising a wavelength selective retarder provided in front of the at least one variable focus lens, the wavelength selective retarder being configured to selectively delay a phase based on a color of an incident light.

7. A holographic display device comprising:
a light source configured to emit a plurality of color lights;
a focus modulation optical system comprising at least one variable focus lens that is configured to change a focusing position of incident light by electrical control of the at least one variable focus lens based on a color of light incident on the at least one variable focus lens;
a spatial light modulator configured to form a holographic image by diffracting light output from the focus modulation optical system; and
a controller configured to control the light source to time-sequentially emit the plurality of color lights,
wherein the at least one variable focus lens is configured to time-sequentially adjust a focusing position corresponding to the plurality of color lights, and
wherein the at least one variable focus lens comprises:
a first substrate;
a first electrode layer disposed on the first substrate;
a second substrate disposed opposite to the first substrate, a second electrode layer disposed on the second substrate; and
a liquid crystal layer disposed between the first substrate and the second substrate.

8. The holographic display device of claim 7, wherein
the liquid crystal layer comprises a plurality of active lenses that are configured to change based on a voltage applied between the first electrode layer and the second electrode layer.

9. The holographic display device of claim 8, wherein at least one of the first electrode layer and the second electrode layer comprises stripe-shape electrodes that are disposed apart from each other.

10. The holographic display device of claim 9, wherein at least one of an array pitch, a shape, and a curvature of the plurality of active lenses is configured to change based on a voltage applied to the stripe-shape electrodes.

11. The holographic display device of claim 9, further comprising a fixed focus lens configured to focus light to be emitted on the at least one variable focus lens.

12. The holographic display device of claim 7, further comprising a wavelength selective retarder provided in front of the at least one variable focus lens and configured to selectively delay a phase based on a color of an incident light.

13. The holographic display device of claim 12, further comprising a fixed focus lens configured to focus light to be emitted on the wavelength selective retarder.

14. The holographic display device of claim 7, wherein the at least one variable focus lens comprises:
- a first variable focus lens configured to focus first color light at a first position;
- a second variable focus lens configured to focus second color light at the first position; and
- a third variable focus lens configured to focus third color light at the first position, and
- wherein the first variable focus lens, the second variable focus lens, and the third variable focus lens are sequentially disposed.

15. The holographic display device of claim 14, further comprising:
- a first wavelength selective retarder provided in front of the first variable focus lens;
- a second wavelength selective retarder provided between the first variable focus lens and the second variable focus lens; and
- a third wavelength selective retarder provided between the second variable focus lens and the third variable focus lens.

16. The holographic display device of claim 14, wherein the controller is further configured to control the first variable focus lens, the second variable focus lens, and third variable focus lens to adjust a focusing position corresponding to each of the first color light, the second color light, and third color light, respectively.

17. The holographic display device of claim 7, further comprising a beam deflector configured to deflect the plurality of color lights emitted from the light source.

18. The holographic display device of claim 7, further comprising a position detection sensor configured to detect a position of a viewer viewing the holographic image.

19. A holographic display device comprising:
- a light source configured to emit a plurality of color lights;
- a beam deflector configured to deflect the plurality of color lights emitted from the light source;
- a light guide plate configured to guide the plurality of color lights deflected from the beam deflector;
- a focus modulation optical system comprising a fixed focus lens and a plurality of variable focus lenses that are configured to change a focusing position of the plurality of color lights output from the light guide plate by electrical control of the plurality of variable focus lenses based on a color of the plurality of color lights incident; and
- a spatial light modulator configured to form a holographic image by diffracting the plurality of color lights output from the focus modulation optical system,
- wherein each of the plurality of variable focus lenses comprises a first substrate, a first electrode layer provided on the first substrate, a second substrate disposed opposite to the first substrate, a second electrode layer provided on the second substrate, and a liquid crystal layer provided between the first substrate and the second substrate.

20. The holographic display device of claim 19, wherein the plurality of variable focus lenses comprise:
- a first variable focus lens configured to focus first color light at a first position;
- a second variable focus lens configured to focus second color light at the first position; and
- a third variable focus lens configured to focus third color light at the first position.

* * * * *